United States Patent
Chen et al.

(10) Patent No.: US 11,673,747 B2
(45) Date of Patent: Jun. 13, 2023

(54) METHOD FOR CONSTRUCTING PUMPING-INJECTION WELL OF GROUNDWATER RESERVOIR IN DUMP OF OPEN-PIT MINE

(71) Applicants: CHINA UNIVERSITY OF MINING AND TECHNOLOGY, Jiangsu (CN); CHN ENERGY Investment Group Co., LTD, Beijing (CN)

(72) Inventors: Shuzhao Chen, Jiangsu (CN); Quansheng Li, Jiangsu (CN); Zhiguo Cao, Jiangsu (CN); Liu Han, Jiangsu (CN)

(73) Assignees: CHINA UNIVERSITY OF MINING AND TECHNOLOGY, Jiangsu (CN); CHN ENERGY Investment Group Co., LTD, Beijing (CN)

( * ) Notice: Subject to any disclaimer, the term of this patent is extended or adjusted under 35 U.S.C. 154(b) by 0 days.

(21) Appl. No.: 17/860,063

(22) Filed: Jul. 7, 2022

(65) Prior Publication Data
US 2023/0030574 A1  Feb. 2, 2023

(30) Foreign Application Priority Data
Aug. 2, 2021 (CN) .......................... 202110881569.3

(51) Int. Cl.
*B65G 5/00* (2006.01)
*E21B 43/04* (2006.01)
(Continued)

(52) U.S. Cl.
CPC .............. *B65G 5/005* (2013.01); *E21B 17/00* (2013.01); *E21B 43/04* (2013.01); *E21B 47/00* (2013.01)

(58) Field of Classification Search
CPC .......... E21B 43/00; E21B 43/04; E21B 47/00; E21B 17/00; B65G 5/005
See application file for complete search history.

(56) References Cited

U.S. PATENT DOCUMENTS

2022/0134397 A1*  5/2022  Crichlow ................ B09B 1/008
                                                                588/16

FOREIGN PATENT DOCUMENTS

CA          2173533 A1 * 10/1996
CN      111088788 A  *  5/2020  ............... E02D 3/00
(Continued)

*Primary Examiner* — Daniel P Stephenson
(74) *Attorney, Agent, or Firm* — JCIPRNET

(57) ABSTRACT

Provided herein is a method for constructing a pumping-injection well of a groundwater reservoir in a dump of an open-pit mine. The pumping-injection well includes a bottom pipe, intermediate pipes, and a top pipe in sequence from bottom to top connected from bottom to top. The method includes: arranging a rubble barrier around the pumping-injection well, and installing the bottom pipe of the pumping-injection well at a designed position of the pumping-injection well as a center of circle; continuing to install an intermediate pipe on the bottom pipe, and pile up a rubble pile; continuing to stack multiple intermediate pipes, and starting the construction of the groundwater reservoir; discarding discarded materials from the open-pit mine to form a dump; continuing to stack intermediate pipes to build an inverted trapezoidal surface sump around the pumping-injection well; and installing the top pipe and a well cover to form a complete pumping-injection well.

5 Claims, 5 Drawing Sheets

(51) Int. Cl.
*E21B 17/00* (2006.01)
*E21B 47/00* (2012.01)

(56) References Cited

FOREIGN PATENT DOCUMENTS

JP 7132104 B2 * 9/2022
RO 135366 A2 * 12/2021

* cited by examiner

METHOD FOR CONSTRUCTING PUMPING-INJECTION WELL OF GROUNDWATER RESERVOIR IN DUMP OF OPEN-PIT MINE

CROSS-REFERENCE TO RELATED APPLICATION

This application claims the priority benefit of China application serial no. 202110881569.3, filed on Aug. 2, 2021. The entirety of the above-mentioned patent application is hereby incorporated by reference herein and made a part of this specification.

TECHNICAL FIELD

The present invention belongs to the field of mining production and environmental protection, and particularly relates to a method for constructing a pumping-injection well of a groundwater reservoir in a dump of an open-pit mine.

BACKGROUND

A groundwater reservoir in an open-pit mine can store pit water generated in the production process, to prevent the pit water from being discharged to pollute soil and water, providing a water resource guarantee for the economic development of the mining area. However, at a dump of an open-pit mine, a large amount of loose materials are piled up, and the cementation of rock and soil is poor. The construction of pumping-injection holes after the completion of the groundwater reservoir is extremely prone to collapse and leakage accidents, which leads to difficulties in forming holes and significantly increases the costs of hole layout, making it especially difficult to form large-flow pumping holes requiring a large diameter. Conventional pumping-injection well construction schemes affect the normal production of open-pit mines to some extent. Therefore, to promote the development of open-pit groundwater reservoir projects, it is necessary to develop a pumping-injection system layout method that is coordinated with the open-pit dumping operation and is economically reasonable.

SUMMARY

In view of the above-mentioned problems in the prior art, an objective of the present invention is to provide a method for constructing a pumping-injection well of a groundwater reservoir in a dump of an open-pit mine, so as to solve the adverse effects on normal production caused by the construction of a groundwater reservoir using a dump in an open-pit mine.

To achieve the above objective, the following technical solutions are adopted in the present invention.

A method for constructing a pumping-injection well of a groundwater reservoir in a dump of an open-pit mine is provided, where the pumping-injection well includes a bottom pipe, a plurality of intermediate pipes, and a top pipe in sequence from bottom to top; concrete straight pipes each having an identical diameter and permeable to water are respectively arranged on an outer side of the bottom pipe, an outer side of each of the intermediate pipes, and an outer side of the top pipe; an equal-diameter steel pipe having circular holes densely distributed on a surface thereof is fixedly nested in each of the concrete straight pipes; a bottom of the steel pipe nested in the bottom pipe is flush with a bottom of one of the concrete straight pipes which is located on the outer side of the bottom pipe, a top of the steel pipe nested in the bottom pipe is 1 m higher than a top of the one of the concrete straight pipes which is located on the outer side of the bottom pipe, and an exposed region at the top of the steel pipe nested in the bottom pipe is provided with the circular holes; a horizontal position of a bottom of the steel pipe nested in each of the intermediate pipes is 1 m higher than a horizontal position of a bottom of a respective one of the concrete straight pipes which is located on the outer side of each of the intermediate pipes, a top of the steel pipe nested in each of the intermediate pipes is 1 m higher than a top of the respective one of the concrete straight pipes which is located on the outer side of each of the intermediate pipes, and an exposed region at the top of the steel pipe nested in each of the intermediate pipes is provided with the circular holes; similar to the intermediate pipes, a horizontal position of a bottom of the steel pipe nested in the top pipe is 1 m higher than a horizontal position of a bottom of one of the concrete straight pipes which is located on the outer side of the top pipe, a top of the steel pipe nested in the top pipe is higher than a top of the one of the concrete straight pipes which is located on the outer side of the top pipe, and an exposed region at the top of the steel pipe nested in the top pipe is provided with the circular holes; a well cover is arranged above the top pipe; a circular groove on the steel pipe at the bottom of each of the intermediate pipes is configured to engage with a circular protrusion formed on the steel pipe at the top of the intermediate pipe therebelow or the bottom pipe, so as to connect the pipes as a whole from bottom to top by gravity; a specific construction process includes the following steps:

S1: using a designed position of the pumping-injection well as a center of circle, arranging a radially radiating rubble barrier circumferentially around the pumping-injection well, installing the bottom pipe of the pumping-injection well at the center of circle, fixing the bottom of the bottom pipe with concrete, and piling up a rubble pile which is slightly lower than the top of the bottom pipe around the bottom pipe, to further fix the bottom pipe;

S2: continuing to install an intermediate pipe on the bottom pipe, and continuing to pile up the rubble pile to a height which is 2 to 3 m lower than the top of the intermediate pipe;

S3: continuing to stack multiple intermediate pipes to a design height of the groundwater reservoir, and discarding sandstone and gravel materials with a good hydrophobicity as reservoir materials for constructing the groundwater reservoir, where water is stored in gaps of the sandstone and gravel materials, and stones of the groundwater reservoir bury the intermediate pipes which are already installed to maintain stability thereof;

S4: after the intermediate pipes are installed to a height more than a construction height of the groundwater reservoir, continuing to install the intermediate pipes; starting to normally discard stripped materials of the open-pit mine from an upper surface of the groundwater reservoir; forming steps in the dump; when continuing to discard the stripped materials upward, reserving a pit on an upper layer of each of the steps in the dump along a periphery of the pumping-injection well, filling the pit with the sandstone and gravel materials with the good hydrophobicity to form a sump; continuing to discard the stripped materials, burying the already installed pumping-injection well and the sump, wherein a wellbore installation status is monitored in real time during the installation of the intermediate pipes to perform a correction in a timely manner to ensure that the intermediate pipes are upright;

S5: continuing to stack and install the intermediate pipes; when reaching a height which is 15 m lower than a final height of the dump, starting to construct an inverted cone-shaped surface sump within 30 m around the pumping-injection well, where the surface sump includes a water barrier layer, a permeable layer, an isolation layer, a filter layer, a water injection pipeline, and an ecological landscape layer arranged in sequence from bottom to top;

S6: when a design height of the dump is reached, installing the top pipe and the well cover to form the complete pumping-injection well, and arranging a pump, a pipeline, and a monitoring device in the pumping-injection well.

Further, in the step S5, a structure of each layer of the surface sump is as follows: a clay layer and a geotextile are laid in sequence on a bottom surface and a side surface to construct the water barrier layer, where the clay layer is 1 to 2 m thick; rubble is backfilled on the water barrier layer to a position which is 1.8 to 2.1 m below a final level of the dump to form the permeable layer, as a channel for injected wall to horizontally permeate from the periphery to the wellbore; an 8 to 11 cm thick layer of permeable concrete is laid on the permeable layer to serve as the isolation layer; a 0.9 to 1.1 m thick layer of well-graded sandstones and gravels is laid on the isolation layer to serve as the filter layer, to filter off impurities in the injected water; a plurality of annular water injection pipelines are arranged in an upper part of the filter layer, so that water permeates into the filter layer through holes in the pipelines; and a 0.3 to 0.5 m thick layer of topsoil is laid on a top of the surface sump to plant water-loving plants to construct the ecological landscape layer integrating water, soil, and plants.

Further, the installation of the intermediate pipes in the step S3 is divided into three stages: first, the intermediate pipes equal to about ⅙ of a height of each of the steps are installed, and buried with stones to maintain stability; second, the intermediate pipes equal to about ½ of the height of each of the steps are installed, and buried with dumped soil; and during dumping, the pit equal to about ⅓ of the height of each of the steps is formed, the intermediate pipes are installed, and stones are backfilled in the pit to form the sump at a top of each of the steps in the dump.

Preferably, in the step S1, 8 to 12 rubble barriers are evenly arranged circumferentially, each having a height of 2 to 3 m, a top width of 3 m, and a length extending to an edge of the designed groundwater reservoir.

Preferably, each of the concrete straight pipes has a diameter of 1 to 2 m, a thickness of 100 to 200 mm, and a length of 5 to 10 m, and the circular holes on the steel pipe nested have a diameter of 30 to 50 mm and are arranged at a density of 20 to 30 per $m^2$.

Preferably, a length by which the steel pipe at the top of the top pipe is higher than the concrete straight pipe and a number of the circular holes formed on the steel pipe at the top of the top pipe are less than those of the steel pipes at the top of the intermediate pipes and the bottom pipe.

The present invention adopts a large-diameter pipe as a channel for pumping, injection, and monitoring, and has high efficiency and good reliability. The use of the large-diameter wellbore to form a device installation space can provide a larger fault-tolerant space for the installation of the pumping-injection system, and the normal operation of the pumping-injection system can be ensured through subsequent device installation and correction. By using the weights and nesting effects of the sections of the wellbore to maintain the stability of the upper section of the wellbore, the installation difficulty of the system is lowered. The holes on the nested steel pipes can be used as lifting rings, which facilitates the lifting and installation process. The materials backfilled in the uppermost stepped sump are used to collect, temporarily store and filter the pit water, so that the water flows to the groundwater reservoir through the wellbore. As the backfilled materials play the role of filtering and purification, the costs of pit water purification are reduced. Also, the backfilled materials are easy to replace. The water collection systems are arranged respectively for the steps to collect and temporarily store water from the steps of the dump, and water permeates into the pumping-injection well through the intermediate pipes, and finally converges in the groundwater reservoir. Whereby, the water collection effect is improved, and the water content of rock and soil in the dump is reduced, thereby improving the stability of the slope.

In the figures: 1—bottom pipe, 2—intermediate pipe, 3—top pipe, 4—well cover, 5—concrete straight pipe, 6—steel pipe, 7—rubble barrier, 8—rubble pile, 9—groundwater reservoir, 10—sump, 11—dump, 12—circular hole, 13—pumping-injection well, and 14—surface sump.

DETAILED DESCRIPTION OF THE EMBODIMENTS

Hereinafter, the present invention is further described with reference to drawings.

Figure 1:
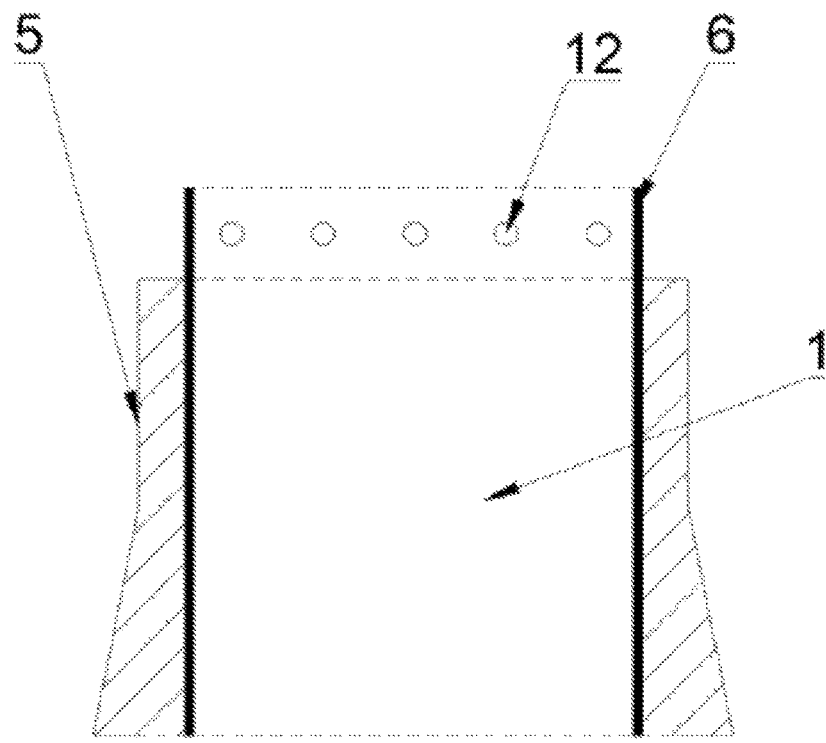
FIG. 1 is a schematic structural diagram of a bottom pipe.
Figure 2:
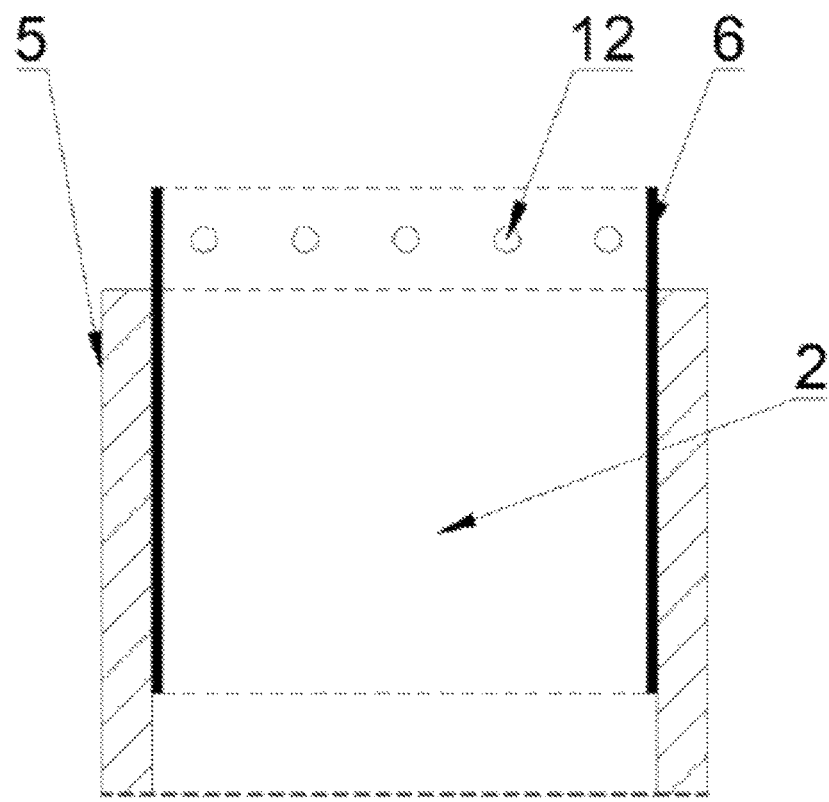
FIG. 2 is a schematic structural diagram of an intermediate pipe.
Figure 3:
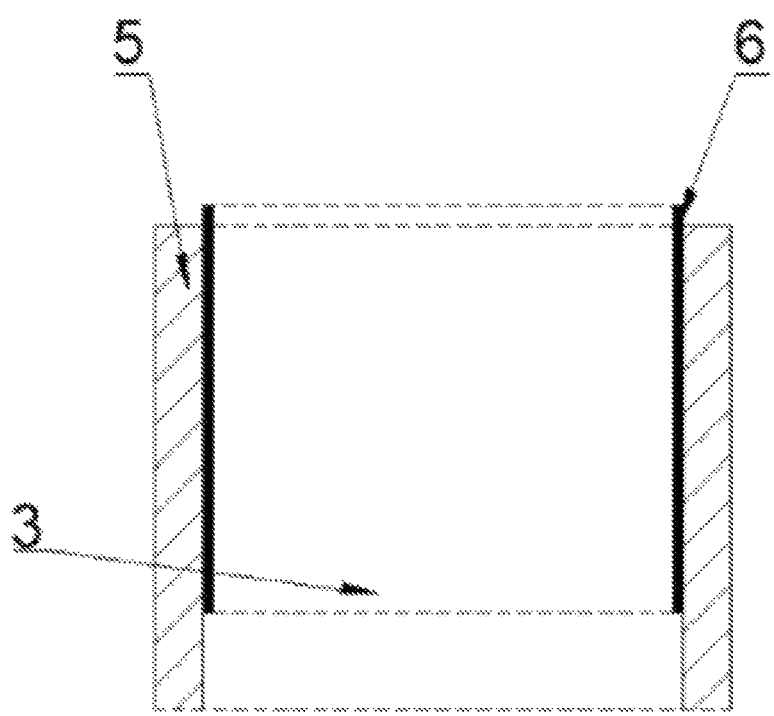
FIG. 3 is a schematic structural diagram of a top pipe.

The present invention provides a method for constructing a pumping-injection well of a groundwater reservoir in a dump of an open-pit mine. The pumping-injection well 13 includes a bottom pipe 1, a plurality of intermediate pipes 2, and a top pipe 3 in sequence from bottom to top. Concrete straight pipes 5 each having an identical diameter and permeable to water are respectively arranged on an outer side of the bottom pipe 1, an outer side of each of the intermediate pipes 2, and an outer side of the top pipe 3. An equal-diameter steel pipe 6 having circular holes 12 densely distributed on a surface thereof is fixedly nested in each of the concrete straight pipes 5. As shown in FIG. 1, a bottom of the steel pipe 6 nested in the bottom pipe 1 is flush with a bottom of the concrete straight pipe 5 on the outer side of the bottom pipe 1, a top of the steel pipe 6 is 1 m higher than a top of the concrete straight pipe 5 on the outer side, and an exposed region at the top of the steel pipe 6 is also provided with circular holes 12. As shown in FIG. 2, a horizontal position of a bottom of the steel pipe 6 nested in each of the intermediate pipes 2 is 1 m higher than a horizontal position of a bottom of the concrete straight pipe 5 on the outer side of each of the intermediate pipes 2, a top of the steel pipe 6 is 1 m higher than a top of the concrete straight pipe 5 on the outer side of each of the intermediate pipes 2, and an exposed region at the top of the steel pipe 6 is also provided with circular holes 12. As shown in FIG. 3, similar to the intermediate pipes 2, a horizontal position of a bottom of the steel pipe 6 nested in the top pipe 3 is 1 m higher than a horizontal position of a bottom of the concrete straight pipe 5 on the outer side of the top pipe 3, a top of the steel pipe 6 is also higher than a top of the concrete straight pipe 5 on the outer side of the top pipe 3, and an exposed region at the top of the steel pipe 6 is also provided with circular holes 12. To reduce the manufacturing cost and simplify the manufacturing process, the length by which the steel pipe 6 at the top of the top pipe 3 is higher than the concrete straight pipe 5 and the number of holes formed on the steel pipe 6 at the top of the top pipe 3 are less than those of the steel pipes 6 at the top of the intermediate pipes 2 and the bottom pipe 1. Because the top pipe 3 does not need to be connected upwardly to a pipe, the steel pipe 6 in the top pipe 3 only needs to meet requirements for suspended mounting. A well cover 4 is arranged above the top pipe 3. A circular groove on the steel pipe 6 at the bottom of each of the intermediate pipes 2 is configured to engage with a circular protrusion formed on the steel pipe 6 at the top of the intermediate pipe 2 therebelow or the bottom pipe 1, so as to connect the pipes as a whole from bottom to top by gravity, as shown in FIGS. 1, 2 and 3. As a preferred solution, each of the concrete straight pipes 5 has a diameter of 1 to 2 m, a wall thickness of 100 to 200 mm, and a length of 5 to 10 m, and the circular holes 12 on the steel pipe 6 have a diameter of 30 to 50 mm and are arranged at a density of 20 to 30 per $m^2$. Setting the dimensions of the concrete straight pipe 5 on the outer side to the above values are for the purpose of achieving the maximum efficiency of water transportation, while taking into account the difficulty of construction. A too low density of the circular holes 12 may affect the permeation of water, and a too high density of the circular holes 12 may affect the overall stiffness of the steel pipe 6.

A specific construction process includes the following steps.

Figure 4:
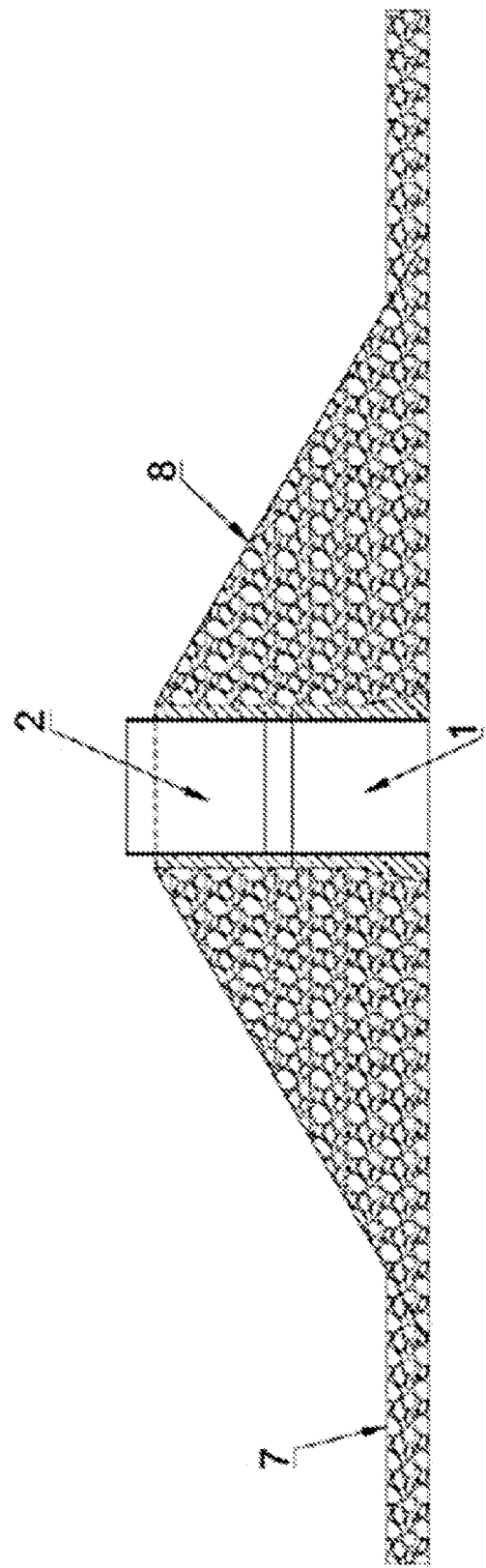
FIG. 4 is a schematic diagram of an initial stage of construction.
Figure 5:
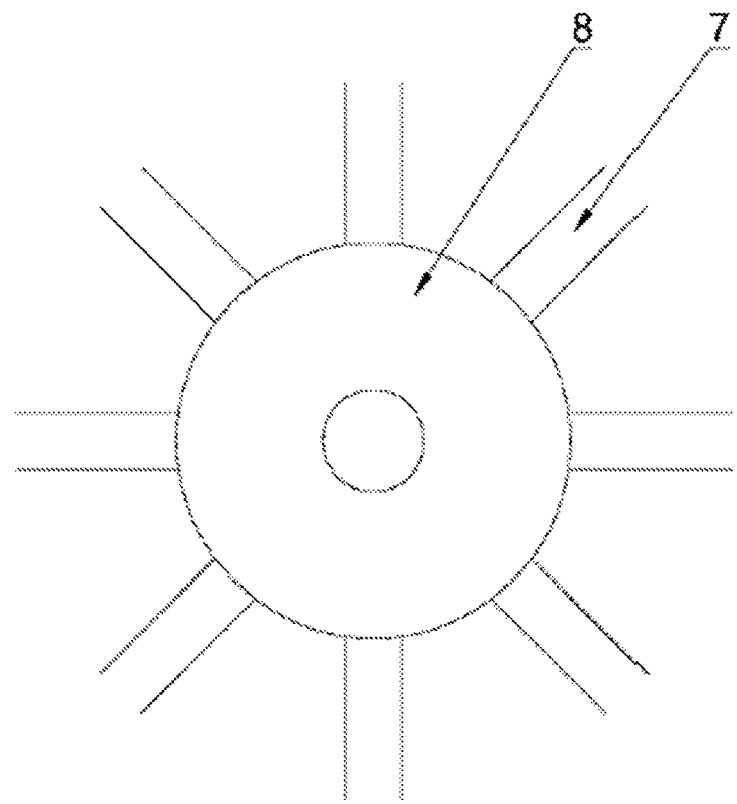
FIG. 5 is a top view of the bottom pipe and a rubble barrier structure.

S1: As shown in FIG. 4, using a designed position of the pumping-injection well 13 as a center of circle, a radially radiating rubble barrier 7 is arranged circumferentially around the pumping-injection well, the bottom pipe 1 of the pumping-injection well 13 is installed at the center of circle, the bottom of the bottom pipe 1 is fixed with concrete, and a rubble pile 8 which is slightly lower than the top of the bottom pipe 1 is piled up around the bottom pipe 1, to further fix the bottom pipe 1. As a more preferred solution, in order to save materials, 8 to 12 rubble barriers 7 may be arranged circumferentially, each having a height of 2 to 3 m, a top width of 3 m, and a length extending to an edge of the designed groundwater reservoir 9, as shown in FIG. 5.

S2: An intermediate pipe 2 continues to be installed on the bottom pipe 1, and the rubble pile 8 continues to be piled up to a height which is 2 to 3 m lower than the top of the intermediate pipe 2, as shown in FIG. 4.

S3: Multiple intermediate pipes 2 continue to be stacked to a design height of the groundwater reservoir 9, and sandstone and gravel materials with good hydrophobicity are discarded as reservoir materials for the construction of the groundwater reservoir 9, where water is stored in gaps of the sandstone and gravel materials, and sandstone and gravel materials of the groundwater reservoir 9 bury the already installed intermediate pipes 2 to maintain stability. The installation of the intermediate pipes 2 is divided into three stages: first, the intermediate pipes 2 equal to about ⅙ of a height of each of the steps are installed, and buried with stones to maintain stability; second, the intermediate pipes 2 equal to about ½ of the height of each of the steps are installed, and buried with dumped soil; and during dumping, the pit equal to about ⅓ of the height of each of the steps is formed, the intermediate pipes 2 are installed, and stones are backfilled in the pit.

Figure 6:
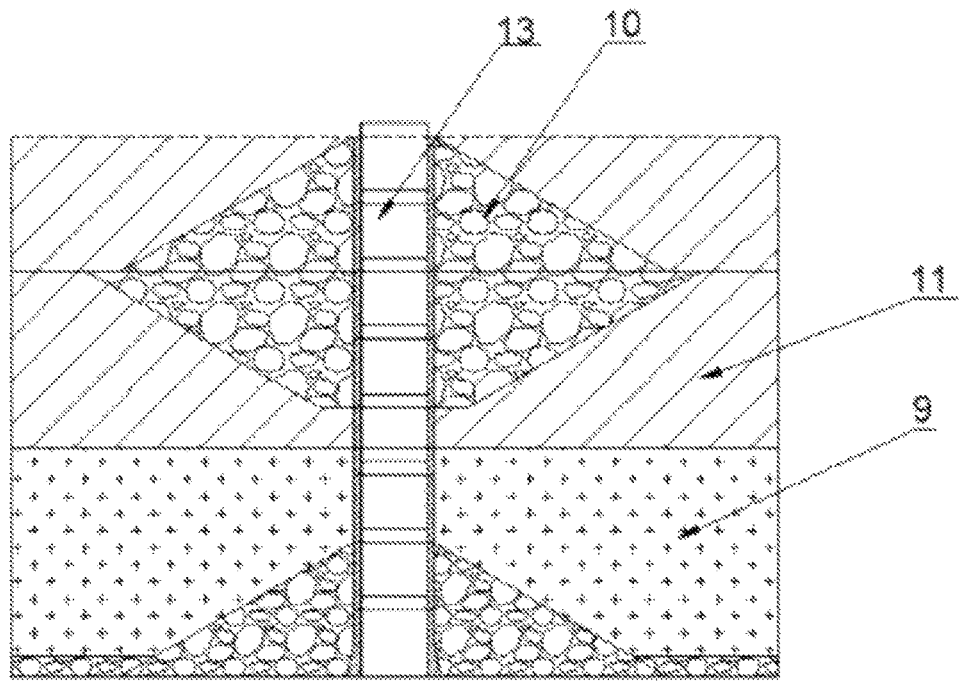
FIG. 6 is a schematic structural diagram of a stepped sump.

S4: After the intermediate pipes 2 are installed to more than a construction height of the groundwater reservoir 9, the intermediate pipes 2 continue to be installed. Stripped materials from the open-pit mine start to be normally discarded from an upper surface of the groundwater reservoir 9. Steps in the dump 11 are formed. When the groundwater reservoir 9 is piled up with materials, the materials continue to be discarded to the upper layer. Each time 20 to 30 m of materials are discarded upward, a pit with a depth of 3 to 5 m is formed around the pumping-injection well 13 by using the pumping-injection well 13 as a center of circle and using 20 m as the radius. Sandstone and gravel materials with good hydrophobicity are backfilled in the pit. After the pit is filled up, sandstone and gravel materials continue to be piled up, to form a 3 to 5 m high hump around the pumping-injection well 13 with a bulldozer, thus forming a sump 10 corresponding to the step, as shown in FIG. 6. The sump 10 also plays the role of water storage, and water is stored in gaps between rubble blocks. A wellbore installation status is monitored in real time using an inclinometer or other devices during the installation of the intermediate pipes 2, and correction is performed in a timely manner to ensure that the intermediate pipes 2 are upright.

S5: The intermediate pipes 2 continue to be stacked and installed. When a height which is 15 m lower than a final height of the dump 11 is reached, an inverted cone-shaped surface sump 14 starts to be constructed within 30 m around the pumping-injection well 13. The surface sump 14 includes a water barrier layer, a permeable layer, an isolation layer, a filter layer, a water injection pipeline, and an ecological landscape layer arranged in sequence from bottom to top. A specific layout manner is as follows.

A clay layer and a geotextile are laid in sequence on a bottom surface and a side surface of the surface sump 14 to construct the water barrier layer, where the clay layer is 1 to 2 m thick, to prevent water from permeating into the dump 11 during the injection process; rubble is backfilled on the water barrier layer to a position which is 1.8 to 2.1 m below a final level of the dump 11 to form the permeable layer, as a channel for injected wall to horizontally permeate from the periphery to the wellbore; an 8 to 11 cm thick layer of permeable concrete is laid on the permeable layer to serve as the isolation layer, to prevent fine particles in the filter layer from entering the permeable layer with water during the injection process; a 0.9 to 1.1 m thick layer of well-graded sandstones and gravels is laid on the isolation layer to serve as the filter layer, to filter off impurities in the injected water; a plurality of annular water injection pipelines are arranged in an upper part of the filter layer, so that water permeates into the filter layer through holes in the pipelines; and a 0.3 to 0.5 m thick layer of topsoil is laid on a top of the surface sump 14 to plant water-loving plants to construct the ecological landscape layer integrating water, soil, and plants.

Figure 7:
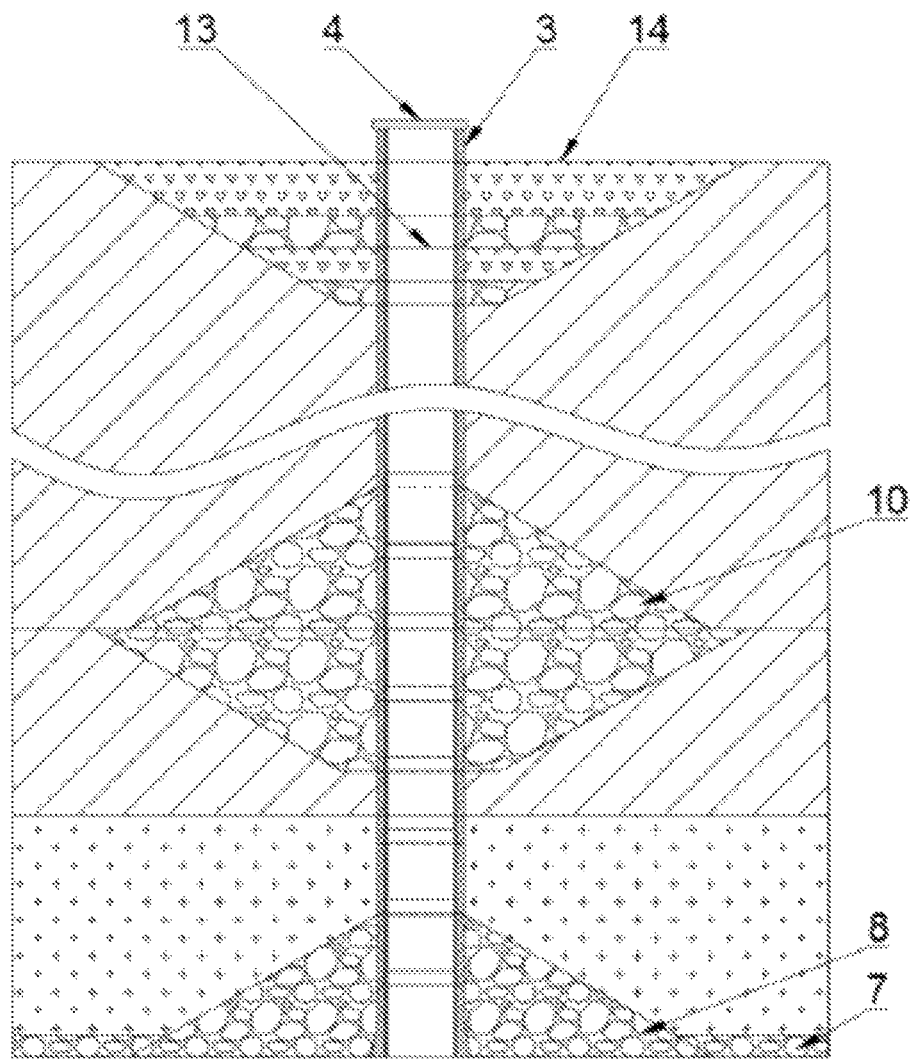
FIG. 7 is a schematic diagram of a completed state of construction.

S6: When a design height of the dump 11 is reached, the top pipe 3 and the well cover 4 are installed to form the complete pumping-injection well 13, and a pump, a pipeline, a monitoring device, and the like are arranged in the pumping-injection well 13, as shown in FIG. 7.

What is claimed is:

1. A method for constructing a pumping-injection well of a groundwater reservoir in a dump of an open-pit mine, wherein the pumping-injection well comprises a bottom pipe, a plurality of intermediate pipes, and a top pipe in sequence from bottom to top; concrete straight pipes each having an identical diameter and permeable to water are respectively arranged on an outer side of the bottom pipe, an outer side of each of the intermediate pipes, and an outer side of the top pipe; an equal-diameter steel pipe having circular holes distributed on a surface thereof is fixedly nested in each of the concrete straight pipes; a bottom of the steel pipe nested in the bottom pipe is flush with a bottom of one of the concrete straight pipes which is located on the outer side of the bottom pipe, a top of the steel pipe nested in the bottom pipe is 1 m higher than a top of the one of the concrete straight pipes which is located on the outer side of the bottom pipe, and an exposed region at the top of the steel pipe nested in the bottom pipe is provided with the circular holes; a horizontal position of a bottom of the steel pipe nested in each of the intermediate pipes is 1 m higher than a horizontal position of a bottom of a respective one of the concrete straight pipes which is located on the outer side of each of the intermediate pipes, a top of the steel pipe nested in each of the intermediate pipes is 1 m higher than a top of the respective one of the concrete straight pipes which is located on the outer side of each of the intermediate pipes, and an exposed region at the top of the steel pipe nested in each of the intermediate pipes is provided with the circular holes; similar to the intermediate pipes, a horizontal position of a bottom of the steel pipe nested in the top pipe is 1 m higher than a horizontal position of a bottom of one of the concrete straight pipes which is located on the outer side of the top pipe, a top of the steel pipe nested in the top pipe is higher than a top of the one of the concrete straight pipes which is located on the outer side of the top pipe, and an exposed region at the top of the steel pipe nested in the top pipe is provided with the circular holes; a well cover is arranged above the top pipe; the steel pipe at the bottom of each of the intermediate pipes is configured to engage with the steel pipe at the top of a respective one of the intermediate pipes therebelow or the bottom pipe through a groove-protrusion technique, so as to connect the pipes as a whole from bottom to top by gravity;

the method comprises following steps:

S1: using a designed position of the pumping-injection well as a center of circle, arranging a radially radiating rubble barrier circumferentially around the pumping-injection well, installing the bottom pipe of the pumping-injection well at the center of the circle, fixing a bottom of the bottom pipe with concrete, and piling up a rubble pile which is slightly lower than a top of the bottom pipe around the bottom pipe, to further fix the bottom pipe;

S2: continuing to install an intermediate pipe of the intermediate pipes on the bottom pipe, and continuing to pile up the rubble pile to a height which is 2 m to 3 m lower than a top of the intermediate pipe;

S3: continuing to stack multiple intermediate pipes of the intermediate pipes to a design height of the groundwater reservoir, and discarding sandstone and gravel materials as reservoir materials for constructing the groundwater reservoir, wherein water is stored in gaps of the sandstone and gravel materials, and stones of the groundwater reservoir bury the intermediate pipes which are already installed to maintain stability thereof;

S4: after the intermediate pipes are installed to a height more than a construction height of the groundwater reservoir, continuing to install the intermediate pipes; starting to normally discard stripped materials of the open-pit mine from an upper surface of the groundwater reservoir, forming steps in the dump; when continuing to discard the stripped materials upward, reserving a pit on an upper layer of each of the steps in the dump along a periphery of the pumping-injection well, filling the pit with the sandstone and gravel materials to form a sump; continuing to discard the stripped materials, burying the already installed pumping-injection well and the sump, wherein a wellbore installation status is monitored in real time during the installation of the intermediate pipes to perform a correction in a timely manner to ensure that the intermediate pipes are upright;

S5: continuing to stack and install the intermediate pipes; when reaching a height which is 15 m lower than a final height of the dump, starting to construct an inverted cone-shaped surface sump within 30 m around the pumping-injection well; and S6: when a design height of the dump is reached, installing the top pipe and the well cover to form the complete pumping-injection well.

2. The method for constructing the pumping-injection well of the groundwater reservoir in the dump of the open-pit mine according to claim 1, wherein the installation of the intermediate pipes in the step S3 is divided into three stages: first, the intermediate pipes equal to ⅙ of a height of each of the steps are installed, and buried with stones to maintain stability; second, the intermediate pipes equal to ½ of the height of each of the steps are installed, and buried with dumped soil; and third, during dumping, the pit equal to ⅓ of the height of each of the steps is formed, the intermediate pipes are installed, and stones are backfilled in the pit to form the sump at a top of each of the steps in the dump.

3. The method for constructing the pumping-injection well of the groundwater reservoir in the dump of the open-pit mine according to claim 2, wherein in the step S1, 8 to 12 rubble barriers are evenly arranged circumferentially, each of the rubble barriers has a height of 2 m to 3 m, a top width of 3 m, and a length extending to an edge of the designed groundwater reservoir.

4. The method for constructing the pumping-injection well of the groundwater reservoir in the dump of the open-pit mine according to claim 1, wherein each of the concrete straight pipes has a diameter of 1 m to 2 m, a thickness of 100 mm to 200 mm, and a length of 5 m to 10 m, and the circular holes on the steel pipe nested each have a diameter of 30 to 50 mm and are arranged at a density of 20 to 30 per m$^2$.

5. The method for constructing the pumping-injection well of the groundwater reservoir in the dump of the open-pit mine according to claim 1, wherein a length by which the steel pipe at the top of the top pipe is higher than the concrete straight pipe and a number of the circular holes formed on the steel pipe at the top of the top pipe are less than those of the steel pipe at the top of each of the intermediate pipes and the steel pipe at the top of the bottom pipe.

* * * * *